(12) United States Patent
Bretmersky et al.

(10) Patent No.: US 6,265,830 B1
(45) Date of Patent: Jul. 24, 2001

(54) APPARATUS AND METHOD FOR SUPPLYING A REGULATED CURRENT TO A MAGNETRON FILAMENT

(75) Inventors: Carl A. Bretmersky, North Olmsted; James W. Schmitkons, Lorain, both of OH (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 09/272,890

(22) Filed: Mar. 19, 1999

(51) Int. Cl.[7] ................................ H05B 6/68
(52) U.S. Cl. .................. 315/106; 315/291; 363/21; 363/98; 219/716
(58) Field of Search ................ 315/39.51, 39.63, 315/39.67, 106, 107, 219, 224, 248, 308, 408; 219/715–718, 761; 363/17, 21, 41, 46, 61, 98, 132

(56) References Cited

U.S. PATENT DOCUMENTS

| | | | |
|---|---|---|---|
| 4,620,078 | 10/1986 | Smith | 219/10.55 |
| 4,700,113 * | 10/1987 | Stupp et al. | 315/224 |
| 4,900,909 * | 2/1990 | Suenage et al. | 315/224 |
| 4,928,040 | 5/1990 | Uesaki | 315/248 |
| 5,082,998 * | 1/1992 | Yoshioka | 219/10.55 B |
| 5,224,027 * | 6/1993 | Kyong-keun | 363/21 |
| 5,571,439 * | 11/1996 | Daley et al. | 315/106 |
| 5,642,268 * | 6/1997 | Pratt et al. | 315/106 |

OTHER PUBLICATIONS

Loctite, *Light Cure Technology*, Brochure, undated.

* cited by examiner

*Primary Examiner*—Don Wong
*Assistant Examiner*—Wilson Lee
(74) *Attorney, Agent, or Firm*—Wood, Herron & Evans, LLP

(57) ABSTRACT

A power supply for supplying operating voltages to a magnetron of a lamp heating or curing system. The power supply is mounted remotely from the magnetron and includes a filament transformer for providing a regulated filament current to the magnetron to provide a predetermined filament voltage. Current in the primary of the filament transformer is sensed, and the filament current supplied by the secondary of the filament transformer is controlled by a switching device coupled to the primary of the filament transformer. Methods for supplying regulated filament current to a magnetron are also disclosed.

17 Claims, 3 Drawing Sheets

APPARATUS AND METHOD FOR SUPPLYING A REGULATED CURRENT TO A MAGNETRON FILAMENT

FIELD OF THE INVENTION

The present invention relates generally to power supplies and, more particularly, to a power supply and method for controlling the filament voltage in a magnetron.

BACKGROUND OF THE INVENTION

In lamp heating and curing applications, a magnetron is used to provide microwave radiation to a lamp source, such as an electrodeless ultraviolet (UV) lamp used in the curing of adhesives, sealants or coatings in industrial applications. When the plasma of the lamp is sufficiently excited by the microwave radiation from the magnetron, the lamp illuminates to provide the necessary light wavelength and intensity for the particular heating or curing process.

Known magnetrons typically require one or more power supplies to be coupled to the magnetron for supplying the necessary anode DC current and filament voltage to the magnetron. The filament current of the magnet-on can be relatively high, such as 20 A or more depending on the operating specifications of the magnetron, so a filament transformer that supplies current to the filament is typically mounted at or near the magnetron to eliminate or at least reduce voltage drop in the interconnecting wires.

When the filament transformer is mounted remotely from the magnetron as may be required in certain applications, various approaches have been developed to compensate for the voltage drop in the interconnecting wires to provide the necessary filament voltage at the magnetron. In one approach, the output voltage of the filament transformer is increased at the terminals of the magnetron to compensate for the voltage drop in the interconnecting wires. The input voltage of the filament transformer is then trimmed by a series resistor or a tap associated with the filament transformer to provide the correct filament voltage for a given anode current or operating mode of the magnetron. Another approach is to phase control the voltage output of the filament transformer until the correct filament voltage is obtained.

However, in each of these known approaches, the filament transformer output voltage must be "calibrated" for each lamp heating or curing application to compensate for the voltage drop in the interconnecting wires. Moreover, these known approaches are not immune to variations in line input voltage to the filament transformer. That is, a proper setting or "calibration" of the filament transformer output voltage for one input line voltage will be adversely affected by a change in the input line voltage.

Thus, there is a need for a power supply that may be conveniently mounted remotely from a magnetron without requiring calibration for each lamp heating or curing application. There is also a need for a power supply in a lamp heating or curing system that is generally immune to voltage drops in the wires interconnecting the power supply to the magnetron. There is yet also a need for a lamp heating or curing system power supply that is generally immune to variations in the input line voltage to the power supply.

SUMMARY OF THE INVENTION

The present invention overcomes the foregoing and other shortcomings and drawbacks of power supplies and methods heretofore known for regulating the filament voltage in a magnetron. While the invention will be described in connection with certain embodiments, it will be understood that the invention is not limited to these embodiments. On the contrary, the invention includes all alternatives, modifications and equivalents as may be included within the spirit and scope of the present invention.

The power supply and method of the present invention are particularly adapted to supply a regulated filament current to a magnetron. When the magnetron is operating, the resistance of the magnetron filament is constant as the temperature of the filament is maintained constant according to the specifications of the magnetron supplier. By supplying the proper or regulated filament current to the magnetron for a given anode current or operating mode of the magnetron, the proper filament voltage is assured for that specific anode current or magnetron operating mode, regardless of variations in the resistance in the interconnecting wires or in the input voltages to the power supply.

The power supply includes a switching device adapted to be coupled to an AC voltage source and having a variable conduction angle. The switching device may be a triac, pair of silicon controlled rectifiers (SCRs) or equivalent device that has a variable conduction angle. A filament transformer has a primary that is adapted to be coupled to the AC voltage source through the switching device. The filament transformer has a secondary coupled to the magnetron filament for supplying filament current to the magnetron that is related to the conduction angle of the switching device.

A current sensor is coupled to the filament transformer primary for sensing current in the primary that is proportional to the filament current. A control is coupled to the filament transformer primary and responsive to the current sensor for selectively varying the conduction angle of the switching device to regulate the filament current supplied to the magnetron. By regulating the filament current, the proper filament voltage is assured regardless of variations in the resistance in the interconnecting wires or in the input voltages to the power supply.

In one embodiment of the present invention, the control includes a microcontroller coupled to the switching device and responsive to the current sensor for varying the conduction angle of the switching device coupled to the filament transformer. By varying the conduction angle of the switching device, the filament current supplied to the magnetron by the filament transformer is regulated to thereby provide the proper filament voltage.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
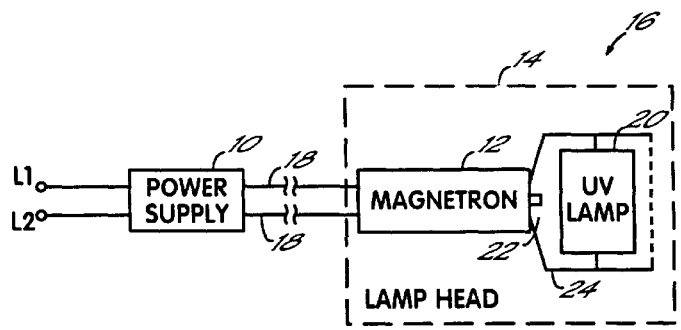
FIG. 1 is a block diagram of a power supply in accordance with the principles of the present invention for supplying operating voltages to a magnetron of a lamp heating or curing system.
Figure 2:
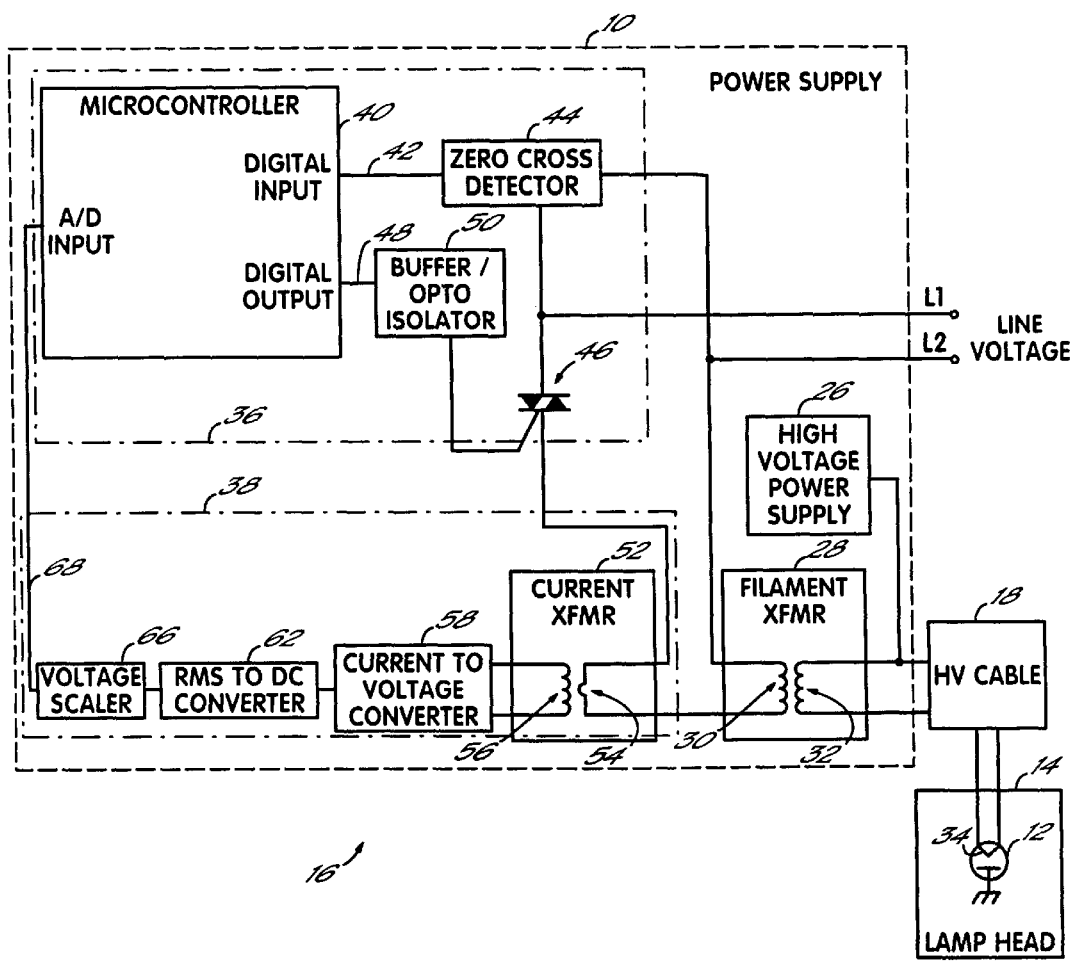
FIG. 2 is a circuit diagram of the power supply illustrated in FIG. 1.

With reference to the figures, and to FIGS. 1–2 in particular, a power supply 10 is shown in accordance with the principles of the present invention for supplying operating voltages to a magnetron 1 2 mounted in a lamp head 14 of a lamp heating or curing system, shown generally as 16. As will be described in detail below, power supply 10 is mounted remotely from the magnetron 12, and is electrically connected to the magnetron 12 through an elongated high voltage cable 18 that may have a length of twenty-five feet or more, or that at least may vary for each lamp heating or curing application in which the lamp system 16 is used.

Power supply 10 is preferably connected to power lines L1 and L2 for receiving AC line voltage at its input, and supplies the necessary operating voltages at its output to magnetron 12 for generating microwave energy as is known by those of ordinary skill in the art. The microwave radiation from the magnetron 12 is coupled to a lamp 20 (FIG. 1), such as an electrodeless ultraviolet (UV) light source, that is located within a cavity 22 (FIG. 1) of an enclosure 24. When the plasma of lamp 20 is sufficiently excited by the microwave radiation from magnetron 12, the lamp 20 illuminates to provide the necessary light wavelength and intensity for the particular heating or curing process. For example, lamp system 16 may be a UV light system used in the curing of adhesives, sealants or coatings in industrial applications, or any other heating or curing process that requires light of a particular wavelength and intensity to achieve the desired heating or curing result.

As best understood with reference to FIG. 2, power supply 10 includes a high voltage DC power supply 26 coupled to the magnetron 12 through the high voltage cable 18 for supplying an operating DC current to the anode of the magnetron 12. The DC power supply 26 does not form part of the present invention per se, and its structure and operation will be appreciated by those of ordinary skill in the art. Power supply 10 further includes an AC filament voltage source in the form of filament transformer 28 for supplying a regulated filament current to the magnetron 12, and for isolating components of the power supply 10 from the high voltage DC voltage source 26. The filament transformer 28 has its primary 30 coupled to the AC power lines L1 and L2, and its secondary 32 is coupled to a filament 34 of magnetron 12 through the high voltage cable 18. As the high voltage cable 18 may have a length of twenty-five feet or more depending on the particular heating or curing application, or at least that may vary for each application, it will be appreciated that considerable voltage drops may occur in cable 18 that could severely degrade the operation of lamp system 16 without proper control of the voltage or current supplied to the magnetron filament 34.

To this end, power supply 10 is particularly adapted to supply a regulated filament current $I_{FIL}$ to magnetron 12 through the secondary 32 of the filament transformer 28. When the magnetron 12 is operating, the resistance $\Omega_{FIL}$ of the filament 34 is constant as the temperature of the filament 34 is maintained constant according to the specifications of the magnetron supplier. By supplying the proper or regulated filament current $I_{FIL}$ to magnetron 12 for a given anode current or operating mode of the magnetron 12, the proper filament voltage $V_{FIL}$ is assured for that specific anode current or magnetron operating mode, regardless of variations in the resistance of cable 18 or in the input voltages to the filament transformer 28.

More particularly, in accordance with the principles of the present invention, power supply 10 includes a control 36 coupled to the filament transformer primary 30 for selectively operating the filament transformer 28 to thereby regulate the filament current $I_{FIL}$ supplied to magnetron 12. Power supply 10 further includes a current sensor 38 coupled to the filament transformer primary 30 for sensing current in the filament transformer primary 30 that is proportional to the filament current $I_{FIL}$ supplied to magnetron 12. As the current in the filament transformer primary 30 is proportional to the filament current $I_{FIL}$ by the turns ratio of the filament transformer 28, the value of filament current $I_{FIL}$ can be determined and used to control operation of the filament transformer 28. As will be described in greater detail below, control 36 is responsive to the current sensor 38 for controlling the filament transformer 28 to thereby regulate the filament current $I_{FIL}$ supplied to magnetron 12 and provide the proper filament voltage $V_{FIL}$ for a given anode current or operating mode of the magnetron 12.

Further referring to FIG. 2, control 36 includes a microcontroller 40 having a digital input for receiving a signal 42 from a zero cross detector 44 known in the art that is coupled to AC line power. As those of ordinary skill in the art will appreciate, zero cross detector 44 will provide a pulse or signal 42 to microcontroller 40 at each zero crossing of the AC line voltage input, i.e., at each 180° of the AC cycle, to thereby synchronize an internal timer (not shown) of the microcontroller 40 with the zero crossing of the AC line voltage input. Control 36 further includes a switching device 46, preferably a triac, pair of silicon controlled rectifiers (SCRs) or equivalent device having a variable conduction angle, coupled in series with the AC line voltage and the filament transformer primary 30. As will be described in detail below, microcontroller 40 provides a digital output signal 48 that is coupled to a gate of the switching device 46 through an opto-isolator 50. The digital output signal 48 of microcontroller 40 selectively varies the conduction angle of the switching device 46 to thereby regulate the filament current $I_{FIL}$ supplied to magnetron 12 through the filament transformer 28. While microcontroller 40 is preferred as part of control 36, those of ordinary skill in the art will appreciate that discrete components could be used to provide the same function as microcontroller 40 without departing from the spirit and scope of the present invention.

The current sensor 38 of power supply 10 includes a current transformer 52 having its primary 54 coupled to the primary 30 of the filament transformer 28. Thus, when the switching device 46 conducts upon receipt of the digital output signal 48 on its gate from microcontroller 40, the current through each primary 54, 30 of the respective current transformer 52 and filament transformer 28 is the same. The current in a secondary 56 of the current transformer 52 is proportional to the current in the current transformer primary 54 by the turns ratio of the current transformer 52. The current transformer secondary 56 is coupled to a current-to-voltage converter 58 known in the art that provides an AC voltage output signal 60 proportional to the current in filament transformer primary 30. The AC voltage output signal 60 from the current-to-voltage converter 58 is applied to an RMS-to-DC converter 62 known in the art that provides a DC voltage signal 64 proportional to the RMS value of the AC voltage output signal 60. The DC voltage signal 64 is applied to a voltage scaler 64 known in the art that amplifies the signal 64 before it is applied as signal 66 to an A/D input of the microcontroller 40. In this way, the current sensor 38 is coupled to the control 36 for selectively controlling operation of the filament transformer 28 to supply a regulated filament current $I_{FIL}$ to the magnetron 12 as described in detail below. While the RMS-to-DC converter 62 is preferred because its output signal 64 is proportional to the heating value of the distorted AC signal 60, those of ordinary skill in the art will readily appreciate that a conventional averaging circuit may be used to provide an average voltage output signal that may be scaled and applied to the microcontroller 40. The average voltage output signal may be further processed by the microcontroller 40 in software to provide a correction factor for the specific conduction angle of the switching device 46. Of course, other modifications to current sensor 38 are possible without departing from the spirit and scope of the present invention.

Figure 3A:
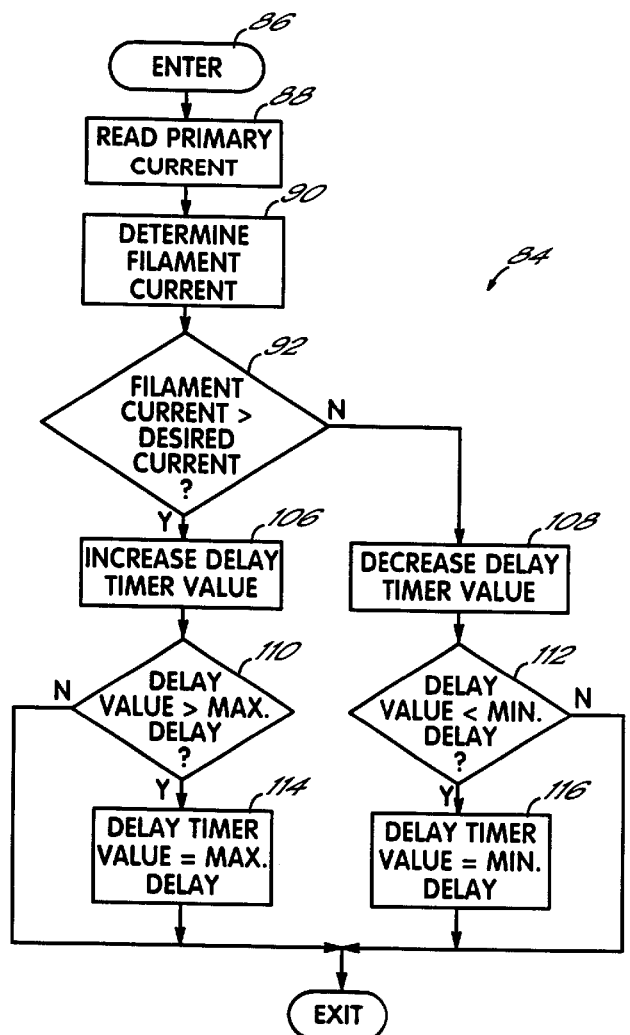
FIG. 3A is a flowchart of a "Current Regulation" routine performed by the power supply of FIG. 1.
Figure 3B:
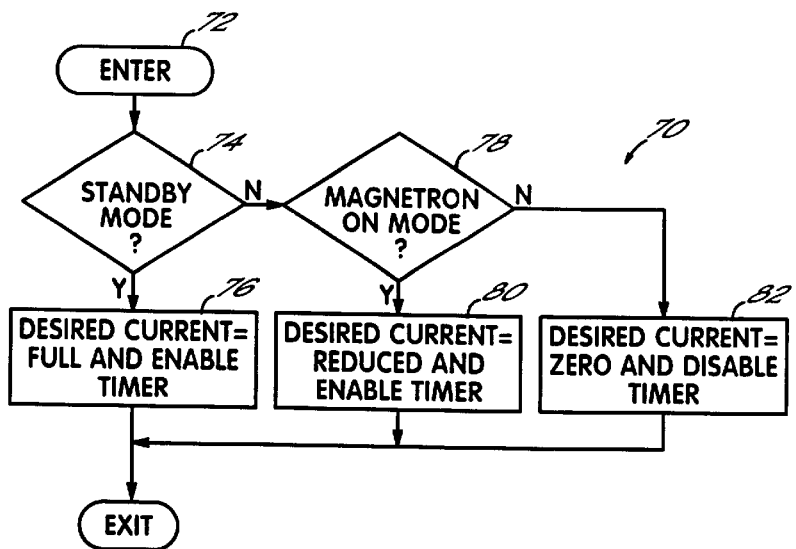
FIG. 3B is a flowchart of a "Determine Desired Current" routine performed by the power supply of FIG. 1.

Referring now to FIGS. 3A–3C and FIG. 4, operation of the power supply 10 will now be described for supplying the regulated current $I_{FIL}$ to the magnetron filament 12. As shown in FIG. 3B, a flowchart of a "Determine Desired Current" routine 70 performed by the microcontroller 40 of power supply 10 is illustrated to determine what mode of operation the magnetron 12 is in and to set the desired filament current $I_{FIL}$ dependent on the detected mode of operation. After the "ENTER" step 72, the microcontroller 40 determines at step 74 whether the magnetron 12 is in "standby mode". In this mode, the anode current of the magnetron 12 is zero and the filament 34 should be supplied a maximum filament current $I_{FIL}$ in accordance with the specifications of magnetron 12 to preheat the filament 34 for future operation of the magnetron 12. At step 76, the microcontroller 40 sets a "desired current" buffer with a value corresponding to "full", i.e., the maximum value of filament current $I_{FIL}$ and enables a timer (not shown) of the microcontroller 40 for purposes to be described in detail below. Those skilled in the art will appreciate that the "desired current" buffer may be a register or other memory structure either internal or external to the microcontroller 40. If the microcontroller 40 determines at step 78 that the magnetron 12 is in "on" mode, the microcontroller 40 sets the "desired current" buffer at step 80 with a value corresponding to "reduced", i.e., a reduced filament current $I_{FIL}$ specified by the magnetron supplier to maintain a constant filament temperature, and enables the timer (not shown). Otherwise, the magnetron is in "off" mode, and at step 82, the microcontroller 40 sets the "desired current" buffer with a value of zero and disables the timer (not shown).

With the "desired current" set by the routine 70 of FIG. 3B, the microcontroller 40 next performs the "Current Regulation" routine 84 illustrated in FIG. 3A to regulate the filament current $I_{FIL}$ of the magnetron 12 in accordance with the principles of the present invention. After the "ENTER" step 86, the microcontroller 40 reads at step 88 the current of the filament transformer primary 30 as sensed through the current sensor 38 described in detail above. At step 90, the microcontroller 40 determines the filament current $I_{FIL}$ from the sensed current of the filament transformer primary 30. Step 90 may comprise a mathematical calculation performed by microcontroller 40 in software to obtain the filament current $I_{FIL}$ from the sensed current of the filament transformer primary 30, or any other hardware or software approach known by those skilled in the art that will permit the value of the filament current $I_{FIL}$ to be determined from the sensed current of the filament transformer primary 30. At step 92, the microcontroller 40 determines if the filament current $I_{FIL}$ exceeds the value set in the "desired current" buffer.

At this point in the "Current Regulation" routine 84, the microcontroller 40 will vary the conduction angle of the switching device 46 by varying a "delay timer value" stored in a buffer or other memory structure either internal or external to the microcontroller 40. As best understood with reference to FIG. 4, the "delay timer value" is a value that controls when the switching device 46 will conduct in each 180° of the AC cycle, i.e., when the microcontroller 40 will apply signal 48 to the gate of the switching device 46 to permit it to conduct. The "delay timer value" is associated with a timer (not shown) of the microcontroller 40 that begins timing at each zero crossing 94 of the AC line input as determined by the zero cross detector 44. For the duration of the set "delay timer value", the switching device 46 is turned off and no filament current $I_{FIL}$ is supplied to the magnetron 12.

Figure 3C:
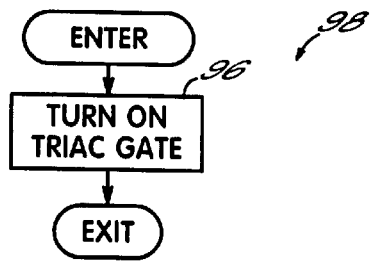
FIG. 3C is a flowchart of a "Timer Interrupt" routine performed by the power supply of FIG. 1.
Figure 3D:
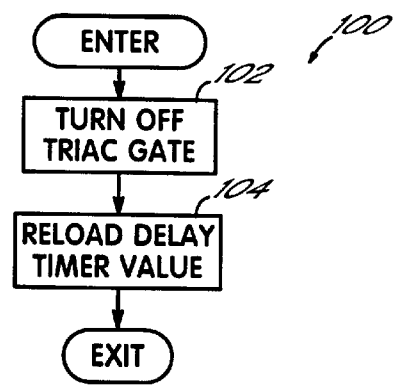
FIG. 3D is a flowchart of a "Zero Cross Interrupt" routine performed by the power supply of FIG. 1.
Figure 4:
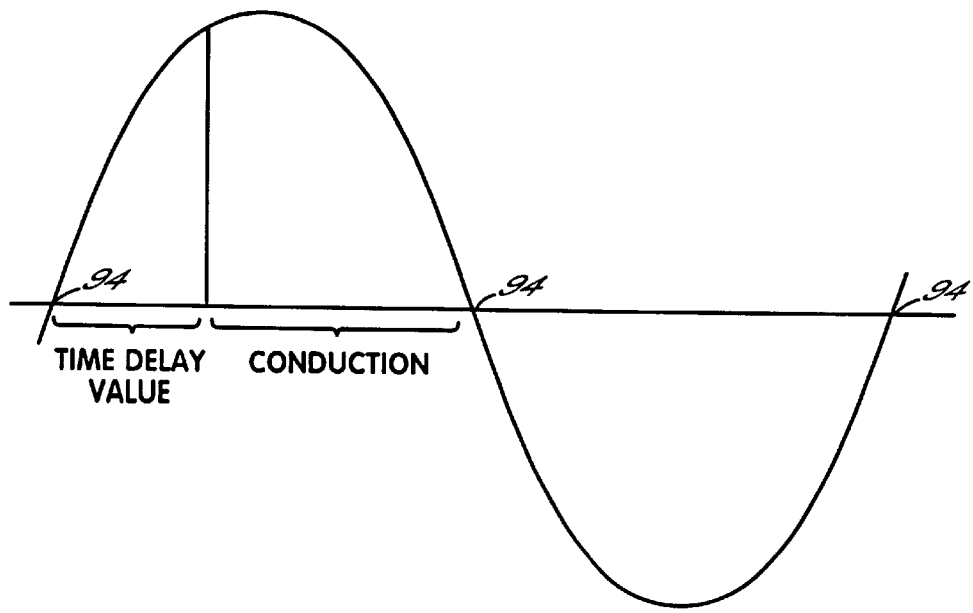
FIG. 4 is a diagrammatic view illustrating the relationships of time delay value and conduction angle relative to an AC input waveform.

When the timer (not shown) times out in each 180° of the AC cycle according to the set "delay time value", the microcontroller 40 applies signal 48 to the gate of switching device 46 to turn it on for the remainder of each 180° portion of the AC cycle, as shown in step 96 of the "Timer Interrupt" routine 98 of FIG. 3C. Thus, the switching device 46 will conduct until the next zero crossing 94 of the AC cycle. As shown in the "Zero Cross Interrupt" routine 100 of FIG. 3D, at step 102 the microcontroller 40 turns off the switching device 46 at each zero crossing 94 of the AC cycle and then reloads the "delay timer value" at step 104.

Returning now to the "Current Regulation" routine 84 of FIG. 3A, if the microcontroller 40 determines at step 92 that the filament current $I_{FIL}$ exceeds the set "desired current" value, the microcontroller 40 increases the "delay timer value" at step 106 to decrease the "on" time of the switching device 46 in each 180° of the AC cycle, thereby decreasing the filament current $I_{FIL}$. Alternatively, if microcontroller 40 determines at step 92 that the filament current $I_{FIL}$ is less than the set "desired current" value, the microcontroller 40 decreases the "delay timer value" at step 108 to increase the "on" time of the switching device 46 in each 180° of the AC cycle, thereby increasing the filament current $I_{FIL}$. At respective steps 110 and 112, the microcontroller 40 determines whether the increased or decreased "delay timer values" are either greater than the maximum allowed delay or less than the minimum allowed delay. If yes to either, the microcontroller 40 at respective steps 114 and 116 sets the "delay timer value" to either the maximum or minimum allowed delay.

Those of ordinary skill in the art will readily appreciate that as the filament resistance $\Omega_{FIL}$ of magnetron 12 is constant, the power supply 10 of the present invention supplies a regulated filament current $I_{FIL}$ to magnetron 12 to provide the desired filament voltage $V_{FIL}$ for a given anode current or mode of operation of the magnetron 12. By supplying the regulated filament current $I_{FIL}$ to provide the necessary filament voltage $V_{FIL}$, rather than by regulating the output voltage of the filament transformer 28, the power supply 10 of the present invention is immune to variations in lengths of the high voltage cable 18, and is also immune to variations in input voltage to the filament transformer 28. Thus, the filament transformer 28 may be conveniently mounted remotely from the magnetron 12 to conserve space at the lamp head 14.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A power supply for supplying a regulated filament current to a filament of a magnetron to provide a predetermined magnetron filament voltage, comprising:
    a filament transformer adapted to be mounted remotely from the magnetron and having a primary adapted to be coupled to an AC voltage source and a secondary adapted to be coupled to the magnetron filament for supplying filament current to the magnetron;
    an elongated electrical cable having one end coupled to the secondary of the filament transformer and a second end adapted to be coupled to the magnetron filament of the magnetron;
    a current sensor coupled to the filament transformer primary for sensing current in the primary that is proportional to the filament current; and
    a control coupled to the filament transformer primary and responsive to the current sensor for selectively operating the filament transformer to regulate the filament current supplied to the magnetron and thereby provide the predetermined magnetron filament voltage.

2. The power supply of claim 1 wherein the control comprises a switching device having one terminal adapted to be coupled to the AC voltage source and a second terminal coupled to the filament transformer primary.

3. The power supply of claim 2 wherein the switching device has a variable conduction angle.

4. The power supply of claim 3 wherein the control further comprises a microcontroller coupled to the switching device and responsive to the current sensor for varying the conduction angle of the switching device coupled to the filament transformer to regulate the filament current supplied to the magnetron and thereby provide the predetermined magnetron filament voltage.

5. The power Supply of claim 1 wherein the current sensor comprises a current transformer having a primary coupled to the filament transformer primary.

6. The power supply of claim 5 wherein the current sensor further comprises a current to voltage converter coupled to a secondary of the current transformer and having an output coupled to the control for providing a signal to the control indicative of the current in the filament transformer primary.

7. A UV generating device, comprising:
    a magnetron for generating microwave radiation;
    a DC voltage source remotely mounted from the magnetron and having an output coupled to the magnetron through an elongated conductor for supplying a direct current to the magnetron;
    a lamp associated with the magnetron for receiving microwave radiation therefrom;
    a filament transformer mounted remotely from the magnetron and having a primary adapted to be coupled to an AC voltage source and a secondary coupled to the magnetron filament for supplying filament current to the magnetron;
    an elongated electrical cable having one end coupled to the secondary of the filament transformer and a second end coupled to the magnetron filament of the magnetron;
    a current sensor coupled to the filament transformer primary for sensing current in the primary that is proportional to the filament current; and
    a control coupled to the filament transformer primary and responsive to the current sensor for selectively operating the filament transformer to regulate the filament current supplied to the magnetron and thereby provide a predetermined magnetron filament voltage.

8. The UV generating device of claim 7 wherein the control comprises a switching device having one terminal adapted to be coupled to the AC voltage source and a second terminal coupled to the filament transformer primary.

9. The UV generating device of claim 8 wherein the switching device has a variable conduction angle.

10. The UV generating device of claim 9 wherein the control further comprises a microcontroller coupled to the switching device and responsive to the current sensor for varying the conduction angle of the switching device coupled to the filament transformer to regulate the filament current supplied to the magnetron and thereby provide the predetermined magnetron filament voltage.

11. The UV generating device of claim 7 wherein the current sensor comprises a current transformer having a primary coupled to the filament transformer primary.

12. The UV generating device of claim 11 wherein the current sensor further comprises a current to voltage converter coupled to a secondary of the current transformer and having an output coupled to the control for providing a signal to the control indicative of the current in the filament transformer primary.

13. A method of regulating current in a filament of a magnetron to provide a predetermined magnetron filament voltage, comprising:
    mounting a filament transformer remotely from the magnetron, the filament transformer having a primary and a secondary;
    supplying an AC voltage to the primary of the filament transformer;
    coupling the secondary of the filament transformer to the magnetron filament through an elongated electrical cable;
    supplying a filament current to the magnetron filament from the secondary of the filament transformer;
    sensing current in the filament transformer primary; and
    regulating the filament current supplied to the magnetron filament in response to the sensed current in the filament transformer primary to provide the predetermined magnetron filament voltage.

14. The method of claim 13 further comprising the step of coupling the filament transformer primary to the AC voltage through a switching device having a variable conduction angle.

15. The method of claim 14 wherein the step of regulating the filament current in the magnetron comprises varying the conduction angle of the switching device.

16. The method of claim 13 wherein the step of sensing current in the filament transformer primary comprises the step of converting the current to a voltage signal indicative of the current.

17. The method of claim 16 wherein the step of regulating the filament current in the magnetron comprises varying the conduction angle of the switching device in response to the voltage signal.

* * * * *

UNITED STATES PATENT AND TRADEMARK OFFICE
CERTIFICATE OF CORRECTION

PATENT NO.    : 6,265,830 B1
DATED         : July 24, 2001
INVENTOR(S)   : Carl A. Bretmersky et al.

It is certified that error appears in the above-identified patent and that said Letters Patent is hereby corrected as shown below:

<u>Column 1,</u>
Line 23, change "The filament current of the magnet-on" to -- The filament current of the magnetron --

<u>Column 7, claim 5,</u>
Line 47, change "The power Supply of claim 1" to -- The power supply of claim 1 --

Signed and Sealed this

Second Day of April, 2002

*Attest:*

JAMES E. ROGAN
*Attesting Officer*   *Director of the United States Patent and Trademark Office*